United States Patent
Hirakawa et al.

(10) Patent No.: US 6,384,122 B1
(45) Date of Patent: *May 7, 2002

(54) THERMOPLASTIC RESIN COMPOSITION AND INJECTION MOLDED ARTICLE THEREOF

(75) Inventors: Manabu Hirakawa; Kenichi Ohkawa, both of Ichihara; Teruhiko Doi, Sodegaura; Tetsuya Hisayama, Ichihara; Yuichi Miyake, Nagoya; Takeyoshi Nishio, Okazaki, all of (JP)

(73) Assignees: Sumitomo Chemical Company, Limited, Osaka; Toyota Jidosha Kabushiki Kaisha, Toyota, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/973,029

(22) PCT Filed: Apr. 7, 1997

(86) PCT No.: PCT/JP97/01183

§ 371 Date: Feb. 24, 1998

§ 102(e) Date: Feb. 24, 1998

(87) PCT Pub. No.: WO97/38050

PCT Pub. Date: Oct. 16, 1997

(30) Foreign Application Priority Data

Apr. 8, 1996 (JP) .............................................. 8-085496

(51) Int. Cl.⁷ ................................................ C09K 3/34
(52) U.S. Cl. ....................................... 524/451; 524/505
(58) Field of Search .................................. 524/451, 505

(56) References Cited

U.S. PATENT DOCUMENTS 5,539,050 A * 7/1996 Fujii et al. ..................... 525/68
5,914,363 A * 6/1999 Sadatoshi et al. ........... 524/451

FOREIGN PATENT DOCUMENTS

| AU | 51983/96 | 11/1996 | |
| EP | 0430490 | 6/1991 | |
| EP | 0509662 | 10/1992 | |
| EP | 0 708 146 | 4/1996 | |
| EP | 0739940 | 10/1996 | |
| JP | 3-227342 | 10/1991 | ........... C08L/23/16 |
| JP | 5-279526 | 10/1993 | ........... C08L/23/16 |
| JP | 8-120129 | 5/1996 | ........... C08L/23/10 |
| JP | 8-302108 | 11/1996 | ........... C08L/23/12 |

OTHER PUBLICATIONS

International Search Report.
WPI/Derwent Publications Ltd., Abstract, AN–1993–149349 (XP–002121761) Apr. 1993.
Patent Abstracts of Japan, C–29, p. 1161 corresponding to JPA 5–279526.
Patent Abstracts of Japan, C–106, p. 898 corresponding to JPA 3–227342.

* cited by examiner

*Primary Examiner*—Peter D. Mulcahy
(74) *Attorney, Agent, or Firm*—Sughrue Mion, PLLC

(57) ABSTRACT

A thermoplastic resin composition that may be used to form injection molded articles, including automobile interior trim. The thermoplastic resin composition has a crystalline polypropylene as the main component and has a melt flow index of 25 to 35 g/10 minutes and a flexural modulus at 23° C. of not less than 20,000 kg/cm$^2$ and comprises, in specific proportion:

(A) A specific crystalline polypropylene;
(B) A specific ethylene-butene-1 copolymer rubber, (C) a specific ethylene-propylene copolymer rubber or (D) a specific vinyl aromatic compound-containing rubber;
(E) Talc; And optionally, Fibrous magnesium oxysulfate.

12 Claims, No Drawings

THERMOPLASTIC RESIN COMPOSITION AND INJECTION MOLDED ARTICLE THEREOF

TECHNICAL FIELD

This invention relates to a thermoplastic resin composition which is excellent in rigidity and impact resistance in respect of physical properties, has a short molding cycle and characteristic features in surface quality such as no generation of flow mark or weldline, no surface strain or the like in respect of injection moldability, and to an injection molded article excellent in dimension stability molded therefrom by an injection molding method, particularly an automobile interior trim material.

More particularly, this invention relates to a thermoplastic resin composition which comprises a specific crystalline polypropylene as a main component and is excellent in rigidity and impact resistance in respect of physical properties and has a short molding cycle and excellent surface quality in respect of injection moldability; and to an injection molded article excellent in dimension stability prepared therefrom by an injection molding method, particularly an injection molded article for automobile interior trim.

BACKGROUND ART

Crystalline ethylene-propylene copolymer/ethylene-propylene copolymer rubber/talc compositions (referred to hereinafter as the ethylene-propylene copolymer rubber type composition) has been widely used as an automobile interior trim material because they are inexpensive, good in moldability and the like. The ethylene-propylene copolymer rubber type resin composition is usually molded into an automobile interior trim material by an injection molding method. As to the injection moldability thereof, it is required firstly that the molding cycle of the present composition be shortened for increasing the productivity; secondly that the present composition give, by an injection molding, an interior trim molded article which has such excellent surface qualities that neither flow mark nor weldline is generated and no surface strain is caused; and the like.

However, conventional ethylene-propylene copolymer rubber type compositions have such problems that when the fluidity thereof is simply increased, the impact strength which is required for an interior trim material is not satisfied though the surface quality is improved in the injection molding and the filling time is shortened but the plasticizing time becomes long and hence the molding cycle is consequently not shortened.

DISCLOSURE OF INVENTION

Under such circumstances, this invention aims at providing a themoplastic resin composition which comprises a crystalline polypropylene as a main component, and which, in respect of physical properties, satisfies the impact strength and rigidity required for an interior trim material and has high flow and good balance between impact strength and rigidity as compared with conventionally used ethylene-propylene copolymer rubber compositions, and in respect of injection moldability, has a short molding cycle and good surface quality, and further providing an injection molded article using the composition, particularly an injection molded article for automobile interior trim.

This invention relates to a thermoplastic resin composition comprising (A) a crystalline polypropylene, (B) an ethylene-butene-1 copolymer rubber, (C) an ethylene-propylene copolymer rubber and (D) a vinyl aromatic compound-containing rubber (at least one of the above (B), (C) and (D) is used), (E) talc and (F) fibrous magnesium oxysulfate and to an injection molded article obtained by molding the above thermoplastic resin composition by an injection molding method.

That is to say, this invention relates to a thermoplastic resin composition which comprises:

(1) 57 to 71% by weight of a crystalline polypropylene (A) selected from the following (i) or (ii):
  (i) a crystalline ethylene-propylene copolymer in which the propylene homopolymer portion which is the first segment has a Q value of 3 to 5 which is the weight average molecular weight (Mw)/number average molecular weight (Mn) ratio according to a gel permeation chromatography (GPC) method, an isotactic pentad fraction of not less than 0.98 as calculated by $^{13}$C-NMR and an intrinsic viscosity of 0.9 to 1.1 dl/g as measured at 135° C. in tetralin; and the ethylene-propylene random copolymer portion which is the second segment has an intrinsic viscosity of 4.5 to 5.5 dl/g as measured at 135° C. in tetralin and an ethylene/propylene ratio of 25/75 to 35/65 (weight % ratio), and
  (ii) a mixture of the crystalline ethylene-propylene block copolymer of (i) with a crystalline propylene homopolymer having a Q value of 3 to 5 according to the GPC method, an isotactic pentad fraction of not less than 0.98 as calculated by $^{13}$C-NMR and an intrinsic viscosity of 0.9 to 1.1 dl/g as measured at 135° C. in tetralin;

(2) 14 to 18% by weight of at least one rubber component selected from the group consisting of the following (B), (C) and (D):
  0 to 5% by weight of the following ethylene-butene-1 copolymer rubber (B):
  an ethylene-butene-1 copolymer rubber having a Q value of not more than 2.7 according to the GPC method, a butene-1 content of 15 to 20% by weight, an intrinsic viscosity of 1.1 to 2.1 dl/g as measured at 70° C. in xylene and a Mooney viscosity at 100° C. (ML$_{1+4}$ 100° C.) of 7 to 90,
  0 to 5% by weight of the following ethylene propylene copolymer rubber (C):
  an ethylene-propylene copolymer rubber having a Q value of not more than 2.7 according to the GPC method, a propylene content of 20 to 30% by weight, an intrinsic viscosity of 1.8 to 2.2 dl/g as measured at 70° C. in xylene and a Mooney viscosity at 100° C. (ML$_{1+4}$ 100° C.) of 35 to 100, and
  10 to 18% by weight of the following vinyl aromatic compound-containing rubber (D):
  a vinyl aromatic compound-containing rubber in which a vinyl aromatic compound is bonded to an olefinic copolymer rubber or a conjugated diene rubber, and which has a vinyl aromatic compound content of 1 to 50% by weight and a melt viscosity at 230° C. at a shear rate of 10 sec$^{-1}$ of not more than 10$^4$ as measured by a capillary flow tester, and which is characterized in that in a blend prepared by adding 10% by weight of the vinyl aromatic compound-containing rubber to a crystalline propylene homopolymer having an isotactic pentad.fraction of 0.98 as calculated by $^{13}$C-NMR and an intrinsic viscosity of 1.55 dl/g as measured at 135° C. in tetralin, the difference (ΔTg, Tg shift) in glass transition point (Tg) attributed to the crystalline propylene homopolymer portion before and after the blending is less than 3° C.;

(3) 15 to 25% by weight of talc having an average particle size of not more than 4 μm (E); and (4) 0 to 10% by weight of fibrous magnesium oxysulfate having a fiber diameter of 0.3 to 2 μm and an average fiber length of 5 to 50 μm (F), and which thermoplastic resin composition satisfies the following equations 1) to 4):

$$(A)+(B)+(C)+(D)+(E)+(F)=100 \quad 1)$$

$$0.20 \leq \{[(A) \times (A)'+(B)+(C)+(D)]/100\} \leq 0.25 \quad 2)$$

$$0.1 \leq \{(A) \times (A)'/[(A) \times (A)'+(B)+(C)+(D)]\} \quad 3)$$

$$15 \leq [(E)+(F)] \leq 25 \quad 4)$$

wherein (A), (B), (C), (D), (E) and (F) indicate weight % of the respective components and (A)' indicates the weight fraction of the second segment in the crystalline polypropylene (A), and has a melt flow index (JIS-K-6758, 230° C.) of 25 to 35 g/10 minutes and a flexural modulus at 23° C. of not less than 20,000 kg/cm², and to an injection molded article obtained from the thermoplastic resin composition, particularly a molded article for automobile interior trim.

This invention is explained below in detail.

In this invention, the crystalline polypropylene (A) means (i) a crystalline ethylene-propylene copolymer having a crystalline propylene homopolymer portion as the first segment and an ethylene-propylene random copolymer portion as a second segment (referred to as the block copolymer in some cases) or (ii) a mixture of such a crystalline ethylene-propylene copolymer with a crystalline propylene homopolymer.

Here, when the crystalline polypropylene (A) is the crystalline ethylene-propylene copolymer (i) which has a crystalline propylene homopolymer portion as the first segment and an ethylene-propylene random copolymer portion as the second segment, the following physical properties, compositions and the like are required:

That is to say, in the crystalline ethylene-propylene copolymer (i), the Q value of the propylene homopolymer portion which is the first segment is 3 to 5, preferably 3.5 to 4.5 which Q value is the weight average molecular weight (Mw)/number average molecular weight (Mn) ratio representing a molecular weight distribution according to a gel permeation chromatography (GPC) method. When the Q value is less than 3, the fluidity is deteriorated and when the Q value exceeds 5, a preferable result is not obtained in relation between the molding cycle and the surface quality during the injection molding.

Furthermore, the isotactic pentad fraction calculated by ¹³C-NMR is not less than 0.98, preferably not less than 0.985. When it is less than 0.98, it is difficult to satisfy the objective rigidity, heat resistance and the like.

Moreover, the intrinsic viscosity of the propylene homopolymer portion is 0.9 to 1.1 dl/g as measured at 135° C. in tetralin. When it exceeds 1.1 dl/g, the melt flow rate of the composition becomes low and the fluidity is deteriorated, the molding cycle becomes long because the filling time becomes long, and simultaneously a good surface quality is not obtained. When it is less than 0.9 dl/g, the tensile elongation and impact strength are low in respect of physical properties and a good surface quality is obtained in respect of injection moldability but the plasticizing time becomes long and hence the molding cycle becomes long and a preferable result is not obtained.

When the ethylene/propylene ratio of the ethylene-propylene random copolymer portion which is the second segment is 25/75 to 35/65 (weight % ratio) (the ethylene content $(C2')_{EP}$ is 25 to 35% by weight, the total of ethylene and propylene is taken as 100% by weight, the same applies hereinafter), more preferably 27/75 to 32/78 (weight % ratio) (the ethylene content $(C2')_{EP}$ is 27 to 32% by weight). When the ethylene content is less than 25% by weight or exceeds 35% by weight, a preferable result is not obtained as to the impact resistance of the composition. Moreover, the intrinsic viscosity $[\eta]_{EP}$ of the ethylene-propylene random copolymer portion is preferably 4.5 to 5.5 dl/g, more preferably 4.8 to 5.3 dl/g, and when it is less than 4.5 dl/g a flow mark is generated during the injection molding and when it exceeds 5.5 dl/g, a hard spot portion is caused and a preferable result is not obtained in respect of surface quality.

When the crystalline polypropylene (A) is (ii) the mixture of the above crystalline ethylene-propylene copolymer (i) with a crystalline propylene homopolymer, the following physical properties, compositions and the like are required:

That is, similarly to the above crystalline ethylene-propylene copolymer (i), the Q value which is the weight average molecular weight (Mw)/number average molecular weight (Mn) ratio representing a molecule distribution according to the (GPC) method is 3 to 5; the isotactic pentad fraction calculated by ¹³C-NMR is not less than 0.98. Moreover, the intrinsic viscosity of the propylene homopolymer portion is 0.9 to 1.1 dl/g as measured at 135° C. in tetralin.

An explanation is made below of methods for measuring the above various physical properties. The isotactic pentad fraction is a fraction of propylene monomer unit existing at the center of an isotactic chain in the form of a pentad unit, in other words, the chain in which five propylene monomer units are successively meso-bonded, in the crystalline polypropylene molecular chain as measured by the method disclosed in A. Zambelli et al., Macromolecules, 6, 925 (1973), namely by use of ¹³C-NMR. However, the attribution of the NMR absorption peak is based on Macromolecules, 8, 687 (1975) published thereafter.

Moreover, the weight ratio X of the ethylene-propylene random copolymer portion to the overall block copolymer can be determined by calculation from the following equation by measuring the quantity of heat of crystal fusion of each of the crystalline propylene homopolymer portion and the overall block copolymer:

$$X = 1 - (\Delta Hf)_T/(\Delta Hf)_P$$

$(\Delta Hf)_T$: Quality of heat of fusion of overall block copolymer (cal/g)

$(\Delta Hf)_P$: Quality of heat of fusion of crystalline propylene homopolymer portion (cal/g)

The ethylene content of the ethylene-propylene random copolymer portion can be determined by calculation from the following equation by measuring the ethylene content (weight %) of the overall block copolymer by an infrared absorption spectrum method:

$$(C2')_{EP} = (C2')_T/X$$

$(C2')_T$: Ethylene content (weight %) of overall block copolymer $(C2')_{EP}$: Ethylene content (weight %) of ethylene-propylene random copolymer portion.

Furthermore, the intrinsic viscosity $[\eta]_{EP}$ of the ethylene-propylene random copolymer portion as measured at 135°

C. in tetralin can be determined by calculation from the following equation by measuring the intrinsic viscosity of each of the crystalline homopolymer portion and the overall block copolymer:

$$[\eta]_{EP}=[\eta]_T/X-(1/X-1)[\eta]_P$$

$[\eta]_P$: Intrinsic viscosity (dl/g) of crystalline propylene homopolymer portion $[\eta]_T$: intrinsic viscosity (dl/g) of overall block copolymer.

In the case of use in applications in which impact resistance is particularly required, it is preferable to use, as the crystalline polypropylene, the crystalline ethylene-propylene copolymer (i) consisting of the crystalline propylene homopolymer portion which is the first segment polymerized in the first step and the ethylene-propylene random copolymer portion which is the second segment polymerized in the second step.

Said copolymer can be produced by a slurry polymerization method, a gas phase polymerization method or the like. In particular, in the case of use in applications in which high impact resistance is required, it is necessary to increase the amount of the second segment and it is preferably produced by the gas phase polymerization method.

The high impact resistance polypropylene according to the said gas phase polymerization method can be produced by the method illustrated in JP-A-61-287,917.

In the slurry polymerization method, the amount of the second segment is 10 to 30% by weight, and in the gas phase polymerization method, it is suitably produced in the range of from 10 to 70% by weight.

In the gas phase polymerization method, it is further possible to produce a crystalline ethylene-propylene block copolymer having a large amount of the second segment by the method illustrated in JP-A-1-98,604, and said copolymer is suitably used in applications in which super high impact resistance is required.

The ethylene-propylene copolymer (i) used in this invention is obtained by reacting the monomers in two stages in the presence of a solid catalyst system comprising, as the essential components, magnesium, titanium, a halogen and an aluminum compound. However, the catalyst system is preferably a catalyst system consisting of (a) a trivalent titanium compound-containing solid catalyst component (a complex of titanium trichloride with magnesium), (b) an organoaluminum compound and (c) an electron-donating compound.

The method for producing this catalyst system is stated in detail in, for example, JP-A-61-218,606, JP-A-1-319,508 and the like.

That is to say, it is a catalyst system consisting of (a) a trivalent titanium compound-containing solid catalyst component obtained by reducing a titanium compound represented by the general formula $Ti(OR^1)_nX_{4-n}$ in which $R^1$ represents a hydrocarbon group having 1 to 20 carbon atoms, X represents a halogen atom and n is $0<n\leq4$ with an organomagnesium compound in the coexistence of a Si-O bond-containing silicon compound and an ester compound and then treating the solid product thus obtained with an ester compound, an ether compound and titanium tetrachloride; (b) an organoaluminum compound; and (c) an electron-donating compound.

The titanium compound used in the synthesis of the above solid catalyst component (a) is that represented by the above-mentioned general formula; however, $R^1$ is preferably an alkyl group having 2 to 18 carbon atoms or an aryl group having 6 to 18 carbon atoms. The halogen atom represented by X can be exemplified by chlorine, bromine and iodine, among which chlorine is particularly preferable.

The value of n of the titanium compound represented by the above general formula is $0<n\leq4$, preferably $2\leq n\leq4$, particularly preferably n=4.

The organosilicon compound having a Si-O bond used in the synthesis of the above solid catalyst component (a) includes those represented by the general formulas $Si(OR^2)_mR^3_{4-m}$, $R^4(R^5_2SiO)_pSiR^6_3$ and $(R^7_2SiO)_q$ in which $R^2$ represents a hydrocarbon group having 1 to 20 carbon atoms; $R^3$, $R^4$, $R^5$, $R^6$ and $R^7$ represent hydrocarbon groups having 1 to 20 carbon atoms or hydrogen atoms; m is $0<m\leq4$; p is an integer of 1 to 1,000 and q is an integer of 2 to 1,000.

Specific examples of the organosilicon compound include tetramethoxysilane, dimethyldimethoxysilane, diethoxydiethylsilane, diethoxydiphenylsilane, triethoxyphenylsilane, cyclohexylethyldimethoxysilane, phenyltrimethoxysilane and the like. Among these organosilicon compounds, preferable are alkoxysilane compounds represented by the general formula $Si(OR^2)_mR^3_{4-m}$, preferably $1\leq m\leq4$ and particularly preferable is a tetraalkoxysilane compound corresponding to m=4.

As the organomagnesium compound used in the synthesis of the above solid catalyst component (a), there can be used any type of the organomagnesium compounds having a magnesium-carbon bond. In particular, there are suitably used Grignard compounds represented by the general formula $R^8MgX$ in which $R^8$ represents a hydrocarbon group having 1 to 20 carbon atoms and X represents a halogen and dialkylmagnesium compounds or diarylmagnesium compounds represented by the general formula $R^9R^{10}Mg$ in which $R^9$ and $R^{10}$ are hydrocarbon groups having 1 to 20 carbon atoms. Here, $R^9$ and $R^{10}$ may be the same or different.

As the ester compound used in the synthesis of the above solid catalyst component (a), there are mentioned mono- and polycarboxylic acid esters such as aliphatic carboxylic acid esters, olefinic carboxylic acid esters, alicyclic carboxylic acid esters, aromatic carboxylic acid esters and the like. Among these ester compounds, preferable are olefinic carboxylic acid esters such as methacrylic acid esters, maleic acid esters and the like and phthalic acid esters, and particularly preferable are diesters of phthalic acid.

In addition, as the ether compound, preferable are dialkyl ethers such as diethyl ether, di-n-propyl ether, diisopropyl ether, dibutyl ether, diamyl ether, methyl-n-butyl ether and the like, and particularly preferable are di-n-butyl ether and diisoamyl ether.

The above solid catalyst component (a) is synthesized by reducing a titanium compound with a magnesium compound in the presence of an organosilicon compound and an ester compound, treating the resulting solid product with an ester compound, and thereafter treating the product with a mixture of an ether compound and titanium tetrachloride or a mixture of an ether compound, titanium tetrachloride and an-ester compound. These synthesis reactions are all effected in an atmosphere of an inert gas such as nitrogen, argon or the like.

The reduction reaction temperature is in a temperature range from −50° C. to 70° C., preferably from −30° C. to 50° C., and particularly preferably from −25° C. to 35° C.

The organoaluminum compound of the above component (b) is one having at least one aluminum-carbon bond in the molecule and represented by the general formula $R^{11}_rAlY_{3-r}$ or $R^{12}R^{13}Al-O-AlR^{14}R^{15}$ in which $R^{11}$ to $R^{15}$ represent hydrocarbon groups having 1 to 20 carbon atoms, Y represents a halogen, hydrogen or an alkoxy group and r is $2\leq r\leq3$.

Specific examples of the organoaluminum compound include trialkylaluminums such as triethylaluminum, triisobutylaluminum, trihexylaluminum and the like; dialkylaluminum halides such as diethylaluminum halides, diisobutylaluminum halides and the like; mixtures of triethylaluminum and dialkylaluminum halides; and alkylalumoxanes such as tetraethyldialumoxane, tetrabutyldialumoxane and the like.

Among these organoaluminum compounds, preferable are trialkylaluminums, mixtures of trialkylaluminums with diethylaluminum chloride, and tetraethyldialumoxane.

The amount of the organoaluminum compound used can usually be selected from such a broad range as 0.5 to 1,000 moles per mole of titanium atom in the solid catalyst component (a); however, the range of from 1 to 600 moles is preferable.

As the electron-donating compound of the above component (c), there can be mentioned oxygen-containing electron donors such as alcohols, phenols, ketones, aldehydes, carboxylic acids, esters of organic acids or inorganic acids, ethers, acid amides, acid anhydrides and the like; nitrogen-containing electron donors such as ammonias, nitrites, isocyanates and the like; etc. Among these electron donors, esters of inorganic acids and ethers are preferably used.

The ratio of the aluminum compound of the component (b) and the complex of titanium compound with magnesium compound of the component (a) can be selected from the range of from 3/1 to 20/1 by mole. Moreover, the ratio between the silane compound having a Si—O bond and the complex of the titanium compound with the magnesium compound can be selected from the range of from 1/10 to 1/2 by mole.

The ethylene-butene-1 copolymer rubber (B) in this invention means a random copolymer rubber of ethylene and butene-1 and is commercially available. The butene-1 content of the ethylene-butene-1 copolymer rubber is 15 to 20% by weight, preferably 16 to 19% by weight, and more preferably 17 to 18% by weight. When it is less than 15% by weight, a preferable result is not obtained as to impact resistance, and when it exceeds 20% by weight, a preferable result is not obtained as to rigidity.

The Q value of the ethylene-butene-1 copolymer rubber according to the GPC method is not more than 2.7, preferably not more than 2.5. The intrinsic viscosity is 1.1 to 2.1 dl/g as measured at 70° C. in xylene and the Mooney viscosity at 100° C. ($ML_{1+4}$ 100° C.) is 7 to 90, and these are preferably 1.2 to 2.0 dl/g and 10 to 80, respectively. When the Q value exceeds 2.7, the rigidity becomes low and this is not desirable. When the intrinsic viscosity is less than 1.1 dl/g as measured at 70° C. in xylene and the Mooney viscosity at 100° C. ($ML_{1+4}$ 100° C.) is less than 7, preferable results are not obtained as to rigidity and impact strength, and when these exceed 2.0 dl/g and 90, respectively, the dispersion thereof in the crystalline polypropylene (A) becomes bad and a preferable result is not obtained as to impact strength.

The ethylene-propylene copolymer rubber (C) in this invention means a random copolymer rubber of ethylene and propylene or an ethylene-propylene-non-conjugated diene copolymer rubber, and is commercially available. The propylene content of the ethylene-propylene copolymer rubber is 20 to 30% by weight, preferably 22 to 28% by weight. When it is less than 20% by weight, a preferable result is not obtained as to impact strength, and when it exceeds 30% by weight, a preferable result is not obtained as to rigidity. It is preferable to control the non-conjugated diene content of the copolymer rubber to not more than 7% by weight. When the non-conjugated diene content exceeds 7% by weight, gelation is caused during the kneading and hence it is not desirable.

The Q value according to the GPC method of the ethylene-propylene copolymer rubber is not more than 2.7, preferably not more than 2.5. The intrinsic viscosity is 1.8 to 2.2 dl/g as measured at 70° C. in xylene and the Mooney viscosity at 100° C. ($ML_{1+4}$ 100° C.) is 35 to 100, and these are preferably 1.9 to 2.1 dl/g and 50 to 90, respectively.

When the Q value exceeds 2.7, the rigidity becomes low and this is not desirable. When the intrinsic viscosity is less than 1.8 dl/g as measured at 70° C. in xylene and the Mooney viscosity at 100° C. ($ML_{1+4}$ 100° C.) is less than 35, preferable results are not obtained as to rigidity and impact strength. When these exceed 2.2 dl/g and 100, respectively, the dispersion thereof in the crystalline polypropylene (A) becomes bad and a preferable result is not obtained with respect to impact strength.

The vinyl aromatic compound-containing rubber (D) in this invention includes rubbers in which a vinyl aromatic compound is bonded to an olefinic copolymer rubber or a conjugated diene rubber by polymerization, reaction or the like, for example, block and random copolymers such as styrene-butadiene type rubber (SBR), styrene-butadiene-styrene type rubber (SBS), styrene-isoprene-styrene type rubber (SIS) and the like; these block and random copolymer rubbers in which the rubber components have been hydrogenated; and the like. It is also possible to suitably use a rubber in which a vinyl aromatic compound such as styrene or the like has been reacted with an ethylene-propylene-non-conjugated diene type rubber (EPDM).

The vinyl aromatic compound-containing rubber has a vinyl aromatic compound content of 1 to 50% by weight, preferably 5 to 40% by weight, and more preferably 10 to 30% by weight and a melt viscosity at 230° C. at a shear rate of 10 $sec^{-1}$ of not more than $10^{-4}$ as measured by a capillary flow tester; and is a vinyl aromatic compound-containing rubber characterized in that in a blend of 10% by weight of the vinyl aromatic compound-containing rubber with a crystalline propylene homopolymer having an isotactic pentad fraction of 0.98 as measured by $^{13}C$-NMR and an intrinsic viscosity of 1.55 dl/g as measured at 135° C. in tetralin, the difference (ΔTg, Tg shift) in glass transition point (Tg) attributed to the crystalline propylene homopolymer portion before and after the blending is less than 3° C.

When the Tg shift is not less than 3° C., it becomes compatible with the polypropylene homopolymer portion in the composition to reduce the rigidity and when the melt viscosity is higher than $10^4$ the fluidity of the composition is deteriorated and, in addition, dispersion failure is caused and even impact strength is reduced.

In this invention, in the final composition, at least one member of the ethylene-butene-1 copolymer rubber (B), the ethylene-propylene copolymer rubber (C) and the vinyl aromatic compound-containing rubber (D) is necessary to use.

The total content of the above (B) to (D) in the final composition is 14 to 18% by weight. Moreover, when the amount of the second segment of the crystalline ethylene-propylene block copolymer of (A) is included, [(A)×(A)'+(B) to (D)] is necessary to satisfy the following equations:

$$(A)+(B)+(C)+(D)+(E)+(F)=100 \qquad 1)$$

$$0.20 \leq \{[(A)\times(A)'+(B)+(C)+(D)]/100\} \leq 0.25 \qquad 2)$$

$$0.1 \leq \{(A)\times(A)'/[(A)\times(A)'+(B)+(C)+(D)]\} \qquad 3)$$

When the values are less than these lower limits, a preferable result is not obtained in respect of impact strength, and when the values exceed the above upper limits the fluidity of the composition is deteriorated.

The average particle diameter of the talc (E) used in this invention is not more than 4 µm, preferably not more than 3 µm. When it is more than 4 µm, the reduction of impact strength is large, and an appearance such as gloss or the like becomes bad. The talc may be used without being treated; however, it is possible to use talc whose surface has been treated with various usually known silane coupling agents, titanium-coupling agents, higher fatty acids, higher fatty acid esters, higher fatty acid amides, higher fatty acid salts or other surfactants for the purpose of enhancing the interfacial adhesiveness to the polypropylene type resin and enhancing the dispersibility.

Here, the average particle diameter of talc means a fifty percent particle diameter D50 determined from an integral distribution curve of the undersize method obtained by subjecting a suspension of the particles in a dispersion medium such as water, alcohol or the like to measurement using a centrifugal settling type particle size distribution measuring apparatus.

The fibrous magnesium oxysulfate (F) used in this invention has an average fiber length of 5 to 50 µm, preferably 10 to 30 µm and an average fiber diameter of 0.5 to 1.0 µm.

As specific physical properties of the final composition, it is necessary that the melt flow index (JIS-K-6758, 230° C., a load of 2.16 kg) be 25 to 35 g/10 minutes and the rigidity be such that the flexural modulus at 23° C. is not less than 20,000 kg/cm$^2$.

Moreover, it is desirable that the impact strength is such that the Izod impact strength (notched) at 23° C. is not less than 25 kg.cm/cm and the brittle temperature is not more than 0° C.

The proportions of the above components (E) and (F) contained are required to satisfy the equation 4) $15 \leq [(E)+(F)] \leq 25$. When the proportions are outside these ranges, the thermoplastic resin composition is inferior in heat resistance and when the proportions exceed the upper limits the composition becomes inferior in fluidity and appearance of a molded article, which are not desirable.

The thermoplastic resin composition aimed at by this invention can be obtained only when the structure of each of the components used is specified as mentioned above and the proportion of each of the components blended is limited to the specific range.

The composition of this invention can be produced using a kneader such as a single screw extruder, a twin screw extruder, a Banbury mixer, a hot roll or the like. The mixing of each component may be effected at the same time or may be effected in portions. As a method of adding them in portions, there are a method in which the crystalline polypropylene is kneaded with the talc and thereafter the ethylene-butene-l copolymer rubber, the ethylene-propylene copolymer rubber and the vinyl aromatic compound-containing rubber (these are referred to hereinafter as the rubber collectively) are added and a method in which the crystalline polypropylene is previously kneaded with the talc at a high concentration to form a master batch and this is separately kneaded while it is diluted with the crystalline polypropylene, the rubber or the like. In addition, as a second method of adding them in portions, there are a method in which the crystalline polypropylene is kneaded with the rubber and thereafter the talc is added to and kneaded with them and a method in which the crystalline polypropylene is kneaded with the rubber at a high concentration to form a master batch and thereafter the crystalline polypropylene and the talc are added to and kneaded with the same. As a third method of adding them in portions, there is a method in which the crystalline polypropylene is previously kneaded separately with each of the talc and the rubber and the resulting mixtures are finally kneaded together. The temperature and time required for the kneading are 170 to 250° C. and 1 to 20 minutes, respectively.

Moreover, in these kneaders, in addition to these basic components, there can be compounded an additive such as an antioxidant, an ultraviolet absorber, a lubricant, a pigment, an antistatic agent, a copper-pollution-preventing agent, a flame retardant, a neutralizing agent, a foaming agent, a plasticizer, a nucleating agent, a foam inhibitor, a cross-linking agent or the like.

Incidentally, the thermoplastic resin composition of this invention can be formed into an injection molded article by an injection molding method adopted generally. In particular, it is suitably used as an injection molded article for automobile such as door trim, pillar, instrumental panel or the like.

BEST MODE FOR CARRYING OUT THE INVENTION

This invention is explained below by Examples; however, these are merely illustrative and this invention is not limited to these Examples unless it oversteps the gist.

Methods for measuring physical properties in the Examples are shown below.
(1) Melt Flow Index According to the method prescribed in JIS-K-6758. The measurement is effected at a measurement temperature of 230° C. under a load of 2.16 kg unless otherwise specified.
(2) Flexural Test According to the method prescribed in JIS-K-7203. A test specimen molded by injection molding is used. The thickness of the test specimen is 6.4 mm, and flexural modulus and flexural strength are evaluated under the conditions of a span of 100 mm and a loading rate of 2.0 mm/min. The measurement temperature is 23° C. unless otherwise specified.
(3) Izod Impact Strength According to the method prescribed in JIS-K-7110. A test specimen molded by injection molding is used. The thickness of the test specimen is 6.4 mm, and a notched impact strength of a specimen notch-processed after the molding is evaluated. The measurement temperature is 23° C. unless otherwise specified. At other temperatures than that, the measurement is carried out after the specimen is subjected to state conditioning for two hours in a constant temperature bath at the given temperature.
(4) Brittle Temperature (B. P.)

According to the method prescribed in JIS-K-6758. A specimen having the given size of 6.3×38×2 mm is punched out of a flat plate having a size of 5×150×2 mm molded by injection molding and subjected to evaluation by the given method.
(5) Heat Distortion Temperature (HDT)

According to the method prescribed in JIS-K-7207. Measurement is carried out at a fiber stress of 18.6 kg/cm$^2$.
(6) Mooney Viscosity Measured by the method prescribed in JIS-K-6300. The measurement temperature is 100° C.
(7) Ethylene Content, Propylene Content and Butene-1 Content As to the ethylene content and the propylene content appearing in an infrared absorption spectrum obtained by preparing a press sheet and subjecting the same to measurement, absorbancies in the characteristic bands of methyl group (—CH$_3$) and methylene group (—CH$_2$—) are used and as to the butene-1 content, the absorbance in the characteristic band of ethyl group is used and these contents are determined by a calibration method.

(8) Intrinsic Viscosity

An Ubbellohde viscometer was used to measure reduced viscosities at three concentrations of 0.1, 0.2 and 0.5 dl/g. The intrinsic viscosity was determined by the calculation method described on page 491 of "Kobunshi Yoeki, Kobunshi Jikkengaku 11" published by Kyoritsu Shuppan Kabushiki Kaisha, 1982, namely an extrapolation method by which reduced viscosity is plotted against concentration and the curve is extrapolated to zero concentration.

As to the crystalline polypropylene, tetralin was used as a solvent and evaluation was made at a temperature of 135° C. As to the ethylene-butene-1 copolymer rubber and the ethylene-propylene copolymer rubber, xylene was used as a solvent and evaluation was made at a temperature of 70° C.

(9) Molecular Weight Distribution

Measured by a gel permeation chromatography (GPC) and the conditions shown below were used:

(a) Crystalline Polypropylene

| GPC: | Model 150C manufactured by Waters Company |
|---|---|
| Column: | Two Shodex 80 MA columns manufactured by Showa Denko K. K. |
| Amount of sample: | 300 μl (polymer conc. 0.2 wt. %) |
| Flow rate: | 1 ml/min |
| Temperature: | 135° C. |
| Solvent: | o-Dichlorobenzene |

A calibration curve between elution volume and molecular weight was prepared using a standard polystyrene manufactured by TOSOH CORP. The polystyrene-reduced weight average molecular weight and the polystyrene-reduced number average molecular weight of a test specimen were determined using the calibration curve and the Q value= weight average molecular weight/number average molecular weight was determined as a measure of molecular weight distribution.

(b) Ethylene-butene-1 Copolymer Rubber and Ethylene Propylene Copolymer Rubber

| GPC: | Model 150C manufactured by Waters Company |
|---|---|
| Column: | One Shodex 80 MA column manufactured by Showa Denko K. K. |
| Amount of sample: | 300 μl (polymer conc.: 0.2 wt. %) |
| Flow rate: | 1 ml/min |
| Temperature: | 145° C. |
| Solvent: | o-Dichlorobenzene |

A calibration curve between eluation volume and molecular weight was prepared using s standard polystyrene manufactured by TOSOH CORP. The polystyrene-reduced weight average molecular weight and the polystyrene-reduced number average molecular weight of a test specimen were determined using the calibration curve, and the Q value= weight average molecular weight/number average molecular weight was determined as a measure of molecular weight distribution.

(10) Glass Transition Point (Tg) and Tg Shift

Measured using a solid viscoelasticity measuring apparatus and the conditions shown below were used:

| Solid viscoelasticity measuring apparatus: | Spectrometer SD5600 manufactured by Seiko Denshi Kogyo K. K. |
|---|---|
| Frequency: | 5 Hz |
| Measurement temperature: | −150° C. to 80° C. |
| Glass transition point: | Determined from the absorption peak obtained by the measurement of temperature dispersion of loss modulus. |

Tg shift: To a crystalline propylene homopolymer having an isotactic pentad fraction of 0.98 as calculated by $^{13}$C-NMR and an intrinsic viscosity of 1.55 dl/g as measured at 135° C. in tetralin were added 10% by weight of various rubbers and thereafter the mixture was melt-kneaded and blended at 180° C. using a small size hot roll and the difference (ΔTg) between glass transition points (Tg) attributed to the crystalline propylene homopolymer portion before and after the blending was determined.

(11) Melt Viscosity

Measured by a capillary flow tester and the condition R shown below was used:

Capillary flow tester: Capillograph 1B manufactured by Toyo Seiki Seisakusho

Measurement temperature: 230° C.

Shear rate: 10 sec$^{-1}$

Ratio (L/D) of length (L) to diameter (D) of orifice: 20

Test specimens for evaluation of physical properties in (2), (3), (4) and (5) above were prepared under the following injection molding conditions unless otherwise specified: The composition was dried at 120° C. for 2 hours by a hot-air drier and thereafter injection molded under the conditions of a molding temperature of 220° C., a mold-cooling temperature of 50° C., an injection time of 15 sec and a cooling time of 30 sec using an injection molding machine of Model IS 150E-V manufactured by Toshiba Machine Co., Ltd.

The following compositions were prepared under the following conditions unless otherwise specified: The given amount of each component was measured, preliminarily mixed uniformly in a Henschel mixer and a tumbler and the resulting mixture was extruded at an extrusion rate of 50 kg/hr at a screw revolution of 350 rpm under vent suction by means of a twin screw kneading extruder (TEX 44SS Model 30BW-2V manufactured by JAPAN STEEL WORKS, LTD.). The screw was constructed by arranging a triple thread type rotor and a kneading disc in two kneading zones which are the zone subsequent to the first feed inlet and the zone subsequent to the second feed inlet, respectively.

EXAMPLES 1 to 5 and

Comparative Examples 1 to 4

The various materials shown in Table 1 were kneaded with the formulations shown in Table 2 and injection molded into test specimens under the given conditions. The results of evaluation of physical properties are shown in Table 3.

The Examples of this invention are good in balance and excellent in physical properties such as rigidity, Izod impact strength, brittle temperature and the like as compared with the Comparative Examples.

The crystalline ethylene-propylene block copolymers (BC-1, BC-2) of the Examples were produced by the following method.

(Production of Solid Catalyst Component)

Synthesized by the following method in accordance with the method of Example 1 of JP-A-1-319,508.

(1) Synthesis of Solid Product

A 200-liter reaction vessel equipped with a stirrer and a dropping funnel was purged with $N_2$, and thereafter, charged with 80 liters of hexane, 2.23 liters (2.23 kg, 6.55 moles) of tetrabutoxytitanium, 0.75 liter (0.78 kg, 2.8 moles) of diisobutyl phthalate and 22.1 liters (20.6 kg, 98.9 moles) of tetraethoxysilane to prepare a uniform solution. Subsequently, 51 liters of a dibutyl ether solution of butylmagnesium chloride of a concentration of 2.1 moles/liter was gradually dropped thereinto over 5 hours while the temperature in the reaction vessel was kept at 5° C. After completion of the dropwise addition, the contents were stirred at room temperature for a further one hour, and thereafter, subjected to solid-liquid separation at room temperature, after which the solid portion was washed repeatedly three times with 70 liters of toluene and then toluene was added so that the slurry concentration became 0.2 kg/liter.

A part of the solid product slurry was sampled and subjected to composition analysis to find that the solid product contained 1.7% by weight of titanium atom, 0.1% by weight of phthalic acid ester, 32.7% by weight of ethoxy group and 3.5% by weight of butoxy group.

(2) Synthesis of Ester-treated Solid

A 200-liter reaction vessel was purged with $N_2$, and then, 13.26 kg (47.6 moles) of diisobutyl phthalate was added to the solid product-containing slurry obtained in (1) above, after which the mixture was subjected to reaction at 95° C. for 30 minutes. After the reaction, the mixture was subjected to solid-liquid separation and the solid portion was washed two times with 70 liters of toluene.

(3) Synthesis of Solid Catalyst Component (Activation Treatment)

After completion of the washing in (2) above, the reaction vessel was charged with toluene, 0.87 kg (3.13 moles) of diisobutyl phthalate, 1.16 kg (8.9 moles) of butyl ether and 30 liters (274 moles) of titanium tetrachloride and they were subjected to reaction at 105° C. for 3 hours. After completion of the reaction, the reaction mixture was subjected to solid-liquid separation at the same temperature and thereafter the solid portion was washed two times with 90 liters of toluene at the same temperature. Subsequently, to this solid portion were added toluene, 1.116 kg (8.9 moles) of butyl ether and 15 liters (137 moles) of titanium tetrachloride and they were subjected to reaction at 105° C. for one hour. After completion of the reaction, the reaction mixture was subjected to solid-liquid separation at the same temperature, and thereafter, the solid portion was washed at the same temperature three times with 90 liters of toluene and then three times with 70 liters of hexane, and then dried under reduced pressure to obtain 11.4 kg of a solid catalyst component.

(Production of BC-1)

A SUS-made reactor having an inner volume of 5.5 m³ equipped with a stirrer and a jacket was thoroughly purged with propylene, and then charged with 2.5 m³ of n-heptane, 10 moles of triethylaluminum and 1.5 moles of cyclohexylethyldimethoxysilane, after which the internal temperature was adjusted to 20 to 40° C. and the pressure was adjusted to 0.5 kg/cm²G with propylene, and thereafter, 0.12 kg of the above solid catalyst component was fed. Subsequently, warm water was passed through the above jacket to elevate the inner temperature of the reactor to 75° C. and then the reaction pressure was elevated to 8 kg/cm²G with propylene and hydrogen to start polymerization. Propylene was continuously fed so that the reaction temperature of 75° C. and the reaction pressure of 8 kg/cm²G were kept and polymerization of the crystalline polypropylene portion (referred to hereinafter as P portion) was continued while the feeding was effected so that the hydrogen concentration in the gas phase was kept at 4.0%. When the integrated amount of propylene fed reached 1,080 kg, the feeding of propylene and hydrogen was stopped, and the unreacted monomers in the reactor was removed by degassing, after which the pressure in the reactor was reduced down to 0.5 kg/cm²G and the temperature in the reactor was simultaneously adjusted to 60° C.

About 100 g of the polymer in the P portion was sampled and analyzed to find consequently that the intrinsic viscosity $[\eta]_P$ was 0.94 dl/g, the Mw/Mn ratio of the molecular weight determined by GPC was 4.1, and the xylene-soluble matter at 20° C. was 0.85% by weight.

Subsequently, the reaction pressure was elevated to 3 kg/cm²G with propylene and ethylene in the presence of the P portion to start the polymerization of ethylene-propylene copolymer portion (referred to hereinafter as EP portion). A mixed gas of propylene/ethylene=3/1 (by weight) was continuously fed so that the reaction pressure was kept at 3 kg/cm²G at a reaction temperature of 60° C. and the polymerization of the EP portion was continued while the feeding was controlled so that the hydrogen concentration in the gas phase was kept at 0.01%.

When the integrated amount of the propylene/ethylene mixed gas fed reached 188 kg, the feeding of the monomers was stopped, and the entire amount of the polymer slurry in the reactor was introduced into an inactivation vessel to subject the same to deactivation treatment with butyl alcohol, after which this polymer was centrifuged to recover a solid polymer which was then dried by a drier to obtain 960 kg of a powdery white powder. The overall polymer obtained had an intrinsic viscosity $[\eta]_T$ of 1.52 dl/g and an ethylene content of 4.2% by weight. Moreover, the polymerization ratio between the P portion and the EP portion was 83.7/16.3 (weight ratio) as calculated from the results of measurement of quantity of heat of crystal fusion. Accordingly, the ethylene content of the polymer in the EP portion was 26% by weight and the intrinsic viscosity $[\eta]_{EP}$ of the EP portion was 4.5 dl/g.

To 100 parts by weight of the ethylene-propylene block copolymer obtained were added as stabilizers 0.15 part by weight of calcium stearate, 0.1 part by weight of 2,6-di-t-butyl-4-hydroxytoluene (Sumilizer BHT, a trade name of Sumitomo Chemical Co., Ltd.), 0.05 part by weight of tetrakis[methylene-3-(3',5'-t-butyl-4-hydroxyphenyl)-propionate]methane (Irganox 1010, a trade of Ciba Geigy) and the mixture was pelletized using a continuous twin screw kneader, after which the pellets were injection molded to prepare a test specimen which was then subjected to measurement of physical properties.

The evaluation results are shown in Table 3. Rigidity, impact strength and fluidity were good. (Production of BC-2)

The same procedure as in BC-1 was repeated, except that in order to adjust the $[\eta]_P$ in the P portion to the given value, the hydrogen concentration in the gas phase in the reactor during the polymerization thereof was controlled to 30%, and in order to adjust $[\eta]_{EP}$ and ethylene content in the EP portion to the given values, the hydrogen concentration in the gas phase during the polymerization thereof was adjusted to 0.25% and the weight ratio of propylene/ethylene of the mixed gas was adjusted to 1/3.5.

TABLE 1

| Sample | P portion Q value | Isotactic $[\eta]_p$ (dl/g) | pented fraction | EP portion $[\eta]_{EP}$ (dl/g) | Content 1 (%) | Content 2 (%) |
|---|---|---|---|---|---|---|
| Polypropylene | | | | | | |
| BC-1 | 4.1 | 0.94 | 0.982 | 4.5 | 16.3 | 26 |
| BC-2 | 4.2 | 1.01 | 0.972 | 4.0 | 17.8 | 47 |
| PP-1 | 4.0 | 0.97 | 0.980 | — | — | — |

| Sample | Q value | $ML_{1+4}$ 100° C. | $[\eta]$ (dl/g) | Comonomer content (wt, %) |
|---|---|---|---|---|
| Rubber | | | | |
| EBR | 2.0 | 14 | 1.6 | 17 |
| EPR | 2.1 | 36 | 1.7 | 22 |

| Sample | MI (g/10 min) | Styrene content (wt. %) | Viscosity by capillary flow tester (poise) | Tg shift (° C.) |
|---|---|---|---|---|
| SEBS-1 | 8 | 13 | $8.8 \times 10^3$ | 2.2 |
| SEBS-2 | — | 29 | $1.6 \times 10^4$ | 1.8 |
| HSBR | 8 | 10 | $2.8 \times 10^4$ | 6.3 |

BC: Ethylene-propylene copolymer
PP: Propylene homopolymer
EPR: Ethylene-propylene copolymer rubber
EBR: Ethylene-butene-1 copolymer rubber
SEBS: Stylene-ethylene/butene-1-styrene block coplymer
HSBR: Hydrogenated styrene-butadiene random copolymer
P portion: Propylene homopolymer portion of BC
EP portion: Ethylene-propylene random copolymer portion of BC
Content 1: Content of EP portion in BC
Content 2: Ethylene content in EP portion

TABLE 2

| | Composition (wt. %) | | | | | | | | | |
|---|---|---|---|---|---|---|---|---|---|---|
| | BC-1 | BC-2 | PP-1 | EBR | EPR | SEBS-1 | SEBS-2 | HSBR | TALC | WHISKER |
| Example 1 | 49 | — | 18 | 4 | — | 10 | — | — | 19 | — |
| Example 2 | 49 | — | 18 | — | 4 | 10 | — | — | 19 | — |
| Example 3 | 49 | — | 18 | — | — | 14 | — | — | 19 | — |
| Example 4 | 49 | — | 18 | 2 | — | 12 | — | — | 14 | 5 |
| Comp. Ex. 1 | — | 47 | 20 | 4 | — | 10 | — | — | 19 | — |
| Comp. Ex. 2 | 49 | — | 18 | — | 4 | — | 10 | — | 19 | — |
| Comp. Ex. 3 | 49 | — | 18 | — | 4 | — | — | 10 | 19 | — |
| Comp. Ex. 4 | 49 | — | 18 | 10 | — | 4 | — | — | 19 | — |
| Comp. Ex. 5 | 49 | — | 18 | — | 10 | 4 | — | — | 19 | — |

TALC: Talc
WHISKER: Fibrous magnesium oxysulfate

TABLE 3

| Unit | MI g/10 min | Flexural modulus kg/cm² | Izod impact strength 23° C. kg · cm/cm | Izod impact strength −30° C. kg · cm/cm | HDT ° C. | B. P. ° C. |
|---|---|---|---|---|---|---|
| Example 1 | 30 | 23200 | 30 | 3.6 | 77 | −1 |
| Example 2 | 32 | 22800 | 27 | 3.4 | 76 | −2 |
| Example 3 | 33 | 21900 | 35 | 3.8 | 75 | −7 |
| Example 4 | 31 | 22700 | 34 | 3.7 | 78 | −5 |
| Comp. Ex. 1 | 29 | 22200 | 19 | 3.6 | 76 | −6 |
| Comp. Ex. 2 | 25 | 22500 | 17 | 3.5 | 77 | −4 |
| Comp. Ex. 3 | 29 | 16700 | 24 | 2.1 | 66 | −4 |
| Comp. Ex. 4 | 26 | 22300 | 19 | 3.4 | 76 | +2 |
| Comp. Ex. 5 | 27 | 22000 | 17 | 2.9 | 75 | +7 |

Industrial Applicability

The thermoplastic resin composition provided by this invention is excellent in fluidity, rigidity, impact strength and injection moldability and also excellent in appearance of molded article, for example, flow mark, weldline, surface strain and the like. This thermoplastic resin composition can be easily processed by a conventional processing method such as injection molding, extrusion molding or press molding method to prepare a molded article, a film, a sheet or the like. Among them, the injection molding method is the most preferable molding method in the sense that a good dimension stability is imparted to the thermoplastic resin composition, and in particular, it is good in fitting accuracy with an automobile body and is particularly suitably used in applications of automobile interior trim materials.

What is claimed is:

1. A thermoplastic resin composition which comprises:
   (1) 57 to 71% by weight of (A) a crystalline polypropylene selected from the following (i) or (ii):
      (i) a crystalline ethylene-propylene copolymer in which the propylene homopolymer portion which is the first segment has a Q value of 3 to 5 which is the weight average molecular weight (Mw)/number average molecular weight (Mn) ratio according to a gel permeation chromatography (GPC) method, an isotactic pentad fraction of not less than 0.98 as calculated by $^{13}$C-NMR and an intrinsic viscosity of 0.9 to 1.1 dl/g as measured at 135° C. in tetralin and the ethylene-propylene random copolymer portion which is the second segment has an intrinsic viscosity of 4.5 to 5.5 dl/g as measured at 135° C. in tetralin, an ethylene/propylene ratio of 25/75 to 35/65 (weight % ratio) and which crystalline ethylene-propylene copolymer has a melt flow index (MI) of not less than 30 g/10 minutes,
      (ii) a mixture of the crystalline ethylene-propylene copolymer (i) with a crystalline propylene homopolymer having a Q value of 3 to 5 according to the GPC method, an isotactic pentad fraction of not less than 0.98 as calculated by $^{13}$C-NMR and an intrinsic viscosity of 0.9 to 1.1 dl/g as measured at 135° C. in tetralin;

(2) 14 to 18% by weight of at least one rubber component selected from the group consisting of the following (B), (C) and (D):

(B) 0 to 5% by weight of the following ethylene-butene-1 copolymer rubber:

an ethylene-butene-1 copolymer rubber having a Q value of not more than 2.7 according to the GPC method, a butene-1 content of 15 to 20% by weight, an intrinsic viscosity of 1.1 to 2.1 dl/g as measured at 70° C. in xylene and a Mooney viscosity at 100° C. ($ML_{1+4}$ 100° C.) of 7 to 90, (C) 0 to 5% by weight of the following ethylene propylene copolymer rubber:

an ethylene-propylene copolymer rubber having a Q value of not more than 2.7 according to the GPC method, a propylene content of 20 to 30% by weight, an intrinsic viscosity of 1.8 to 2.2 dl/g as measured at 70° C. in xylene and a Mooney viscosity at 100° C. ($ML_{1+4}$ 100° C.) of 35 to 100, and (D) 10 to 18% by weight of the following vinyl aromatic compound-containing rubber:

a vinyl aromatic compound-containing rubber in which a vinyl aromatic compound is bonded to an olefinic copolymer rubber or a conjugated diene rubber, and which has a vinyl aromatic compound content of 1 to 50% by weight and a melt viscosity at 230° C. at a shear rate of 10 sec$^{-1}$ of not more than $10^4$ as measured by a capillary flow tester, and which is characterized in that in a blend prepared by adding 10% by weight of the vinyl aromatic compound-containing rubber to a crystalline propylene homopolymer having an isotactic pentad fraction of 0.98 as calculated by $^{13}$C-NMR and an intrinsic viscosity of 1.55 dl/g as measured at 135° C. in tetralin, the difference (ΔTg, Tg shift) between glass transition points (Tg) attributed to the crystalline propylene homopolymer portion before and after the blending is less than 3° C.;

(3) 15 to 25% by weight of (E) talc having an average particle size of not more than 4 μm; and (4) 0 to 10% by weight of (F) fibrous magnesium oxysulfate having a fiber diameter of 0.3 to 2 μm and an average fiber length of 5 to 50 μm, and which thermoplastic resin composition satisfies the following equations 1) to 4):

$$(A)+(B)+(C)+(D)+(E)+(F)=100 \quad\quad 1)$$

$$0.20 \leq \{[(A)\times(A)'+(B)+(C)+(D)]/100\} \leq 0.25 \quad\quad 2)$$

$$0.1 \leq \{(A)\times(A)'/[(A)\times(A)'+(B)+(C)+(D)]\} \quad\quad 3)$$

$$15 \leq [(E)+(F)] \leq 25 \quad\quad 4)$$

wherein (A), (B), (C), (D), (E) and (F) represent weight % of the respective components and (A)' represents the weight fraction of the second segment in the crystalline polypropylene (A), and has a melt flow index (JIS-K-6758, 230° C.) of 25 to 35 g/10 minutes and a flexural modulus at 23° C. of not less than 20,000 kg/cm$^2$.

2. The thermoplastic resin composition according to claim 1, wherein the ethylene-propylene random copolymer portion which is the second segment has an intrinsic viscosity of 4.8 to 5.3 dl/g as measured at 135° C. in tetralin and an ethylene/propylene ratio of 27/73 to 32/68 (weight % ratio).

3. The thermoplastic resin composition according to claim 1 or 2, wherein the ethylene-butene-1 copolymer rubber (B) has a butene-1 content of 16 to 19% by weight, a Q value of not more than 2.5, an intrinsic viscosity of 1.2 to 2.0 dl/g and a Mooney viscosity of 10 to 80.

4. The thermoplastic resin composition according to claim 1 or 2, wherein the ethylene-propylene copolymer rubber (C) has a propylene content of 22 to 28% by weight, a Q value of not more than 2.5, an intrinsic viscosity of 1.9 to 2.1 dl/g and a Mooney viscosity of 50 to 90.

5. The thermoplastic resin composition according to claim 1 or 2, wherein the vinyl aromatic compound-containing rubber (D) has a vinyl aromatic compound content of 5 to 40% by weight.

6. An injection molded article, characterized by being obtained by molding the thermoplastic resin composition according to claim 1 or 2, by an injection molding method.

7. An injection molded article according to claim 6, characterized in that the injection molded article is an injection molded article for automobile interior trim.

8. The thermoplastic resin composition according to claim 3, wherein the vinyl aromatic compound-containing rubber (D) has a vinyl aromatic compound content of 5 to 40% by weight.

9. The thermoplastic resin composition according to claim 4, wherein the vinyl aromatic compound-containing rubber (D) has a vinyl aromatic compound content of 5 to 40% by weight.

10. An injection molded article, characterized by being obtained by molding the thermoplastic resin composition according to claim 3 by an injection molding method.

11. An injection molded article, characterized by being obtained by molding the thermoplastic resin composition according to claim 4 by an injection molding method.

12. An injection molded article, characterized by being obtained by molding the thermoplastic resin composition according to claim 5 by an injection molding method.

* * * * *